UNITED STATES PATENT OFFICE.

CHRISTIAN ZIEGENHEIM, OF ALLEGHENY, PENNSYLVANIA.

IMPROVEMENT IN BATHS FOR TREATING IRON.

Specification forming part of Letters Patent No. 178,700, dated June 13, 1876; application filed April 25, 1876.

*To all whom it may concern:*

Be it known that I, CHRISTIAN ZIEGENHEIM, of Allegheny, Allegheny county, Pennsylvania, have invented a new and Improved Bath for Treating Iron, of which the following is a specification:

I make a bath of sal-soda, ten pounds; caustic soda, three pounds; borax, one pound; and lime, one pound, dissolved in clear water, in which I cool the iron, or wash it when cold, to be united to steel in the manufacture of axes, plows, hoes, axles, shafting, and other articles to be made of a combination of iron and steel, to prepare the iron for uniting with the steel by pouring the latter in a melted state on the former placed in a mold.

After washing the iron with the aforesaid bath, and before placing it in the mold, I rub it thoroughly with a brush or other tool to remove the scale and clean the surface.

The iron may be hot or cold when the steel is cast upon it.

Having thus described my invention, I claim as new and desire to secure by Letters Patent—

The herein-described compound for the treatment of iron preparatory to uniting it with steel by casting the steel on the iron, consisting of sal-soda, caustic soda, borax, lime, and water, substantially in the proportions herein specified.

CHRISTIAN ZIEGENHEIM.

Witnesses:
SAMUEL HACKWELDER,
W. H. WENTZ.